United States Patent [19]

Kagosaki et al.

[11] Patent Number: 5,146,268
[45] Date of Patent: Sep. 8, 1992

[54] METHOD OF CONTROLLING EXPOSURE OF PROCESS CAMERA

[75] Inventors: Hiroshi Kagosaki; Shoji Komatsubara, both of Shiga, Japan

[73] Assignee: Dainippon Screen Mfg. Co., Ltd., Kyoto, Japan

[21] Appl. No.: 811,375

[22] Filed: Dec. 20, 1991

[30] Foreign Application Priority Data

Dec. 28, 1990 [JP] Japan .................................. 2-417583

[51] Int. Cl.$^5$ ...................... G03B 27/54; G03B 27/32
[52] U.S. Cl. ............................................ 355/70; 355/77
[58] Field of Search ............................... 355/70, 71, 77

[56] References Cited

U.S. PATENT DOCUMENTS

| | | | |
|---|---|---|---|
| 3,249,000 | 5/1966 | Pack | 355/70 |
| 3,619,055 | 11/1971 | Archer et al. | 355/70 X |
| 3,640,623 | 2/1972 | Florsheim, Jr. et al. | 355/70 X |
| 4,025,189 | 5/1977 | Pugsley | 355/70 X |
| 4,902,899 | 2/1990 | Lin et al. | 355/71 X |
| 5,099,276 | 3/1992 | Kagosaki | 355/70 |

OTHER PUBLICATIONS

*Printing Magazine* 8 (1975): pp. 43–47 "Recent Trends In Exposure Control Systems".
*Thirty Five Years of Image Techniques* (1978): pp. 93–99 "Exposure Control and Apparatus Therefor".

*Primary Examiner*—Richard A. Wintercorn
*Attorney, Agent, or Firm*—Lowe, Price, LeBlanc & Becker

[57] ABSTRACT

A method of controlling exposure prepares basic data and original data, prepares data for correction for determining a correction amount of the original data, obtains first dot image, obtains dot percentage differences $\delta_H$ and $\delta_S$ between dot percentages of a highlight region and a shadow region of the first dot image, respectively, and a desired highlight dot percentage and a shadow dot percentage, obtains a correction amount of the original data based on $\delta_H$ and $\delta_S$ and the data for correction to update the basic data based on the correction amount of the original data, and acquires an exposure amount for obtaining second dot image based on the updated basic data and the original data. An apparatus for implementing this method is also disclosed.

24 Claims, 10 Drawing Sheets (a) INCIDENT LIGHT (b) ORIGINAL DENSITY (c) TRANSMITTED LIGHT (d) DENSITY DISTRIBUTION OF CONTACT SCREEN (e) FORMED DOT (a) SCREEN DENSITY (b) DENSITY CONTOUR MAP

METHOD OF CONTROLLING EXPOSURE OF PROCESS CAMERA

BACKGROUND OF THE INVENTION

1. Field of the Invention

The present invention relates generally to a method of controlling exposure of a process camera and an apparatus therefor, and more particularly, to a method of controlling halftone photography using sub-exposure in a process camera and an apparatus therefor.

2. Description of the Related Art

Obtaining halftone negative image of an original by using a screen such as a contact screen and a halftone screen, is called halftone photography. In halftone photography, contrast of the resultant halftone negative image should correspond to different originals having different densities. The exposure at the halftone photography should be accordingly controlled with high precision.

The halftone negative image is required for the following reasons. In letterpress printing, offset printing, screen printing and the like, continuous tones of an original having contrast such as a photograph are converted to tones represented by the dot areas of the halftone negative image because the continuous tones are difficult to obtain by a printing press or the like. The reason for it is that the printing press basically carries out printing by pressing the surface with ink applied thereto onto the paper with specific pressure, and therefore does not allow a subtle adjustment of the pressure as a person does.

Referring to FIG. 1, suppose an original having a step-like density distribution as shown in FIG. 1(b) is exposed to a film through a contact screen by a transmitted light of specific intensity shown in FIG. 1(a). Hereinafter, "density" of an original is defined as follows throughout this specification and claims attached thereto.

A density Dt of a transparent original (an original through which a light is transmitted) such as a film can be expressed by the following equation:

$$Dt = \log(I_0/I_t) \qquad 1)$$

where light intensity of an incident light on the original is represented as $I_0$ and an intensity of the light after transmitting through the original is represented as $I_t$.

It can be seen from the equation (1) that the higher the density Dt is, the smaller the intensity of the transmitted light is. The intensity of the light transmitted through the original having the density distribution as shown in FIG. 1(b) will be shown accordingly by FIG. 1(c). In FIG. 1(c), the light intensity is represented as a width of the arrow. The density Dt defined by equation (1) is referred to as a transmission density throughout the specification and the claims.

On the other hand, printed matters and photographs are not transparent. Therefore, for such an original (reflection original), its density Dr is defined as follows. A standard sample is illuminated with a predetermined light and the intensity Is of the reflected light for measured. The sample for comparison is illuminated with the same light and the intensity Ir of the reflected light is obtained. The density Dr will be expressed by the following equation.

$$Dr = \log(Is/Ir) \qquad (2)$$

The density Dr defined by equation (2) is referred to as a reflection density throughout the specification and the claims.

For a contact screen, its transmission density Dt is called "screen density". The distribution of screen density of a contact screen in general is shown in FIG. 1(d).

The light of such amount as shown in FIG. 1(c) is transmitted through the contact screen having the density distribution as shown in FIG. 1(d) to reach the film. A film called a lith film is generally used for a photomechanical process. The lith film produces dots when exposed to a light (amount is referred to as an integral exposure amount) of more than a specific amount.

Therefore, when a smaller amount of light is transmitted through the original, dots are formed at only the portions where the densities of the contact screen are low. As the light amount transmitted through the original increases, the lith film produces larger dots. In this way, the halftone negative image is obtained having larger dots representing lower density (brighter) portions of the original and smaller dots representing higher density (darker) portions of the original.

A density distribution of a contact screen is peculiar to the contact screen. In addition, a density range of an original which can be reproduced through one exposure by using a contact screen having a predetermined density distribution is defined by a maximum value and a minimum value of the density of the contact screen. Note that a halftone screen, having a density distribution such that light transmitting portions and light shielding portions are alternately arranged, can provide a density distribution equivalent to the one shown in FIG. 1(d) when the halftone screen is not in contact with the photosensitive material.

Referring to FIG. 2, a difference between the maximum value and the minimum value of the screen density is referred to as "screen range" throughout the specification and the claims. A difference between the maximum value and the minimum value of an original density is referred to as "original range" throughout the specification and the claims.

In practice, original ranges of the originals to be reproduced are different from each other. To reproduce an original having an original range out of a screen range and acquire a halftone negative image in a precise tone requires a special controlling method of exposure.

One of the methods for controlling contrast of a halftone negative image corresponding to a various originals in halftone photography using a process camera is a sub-exposure method. This method generally includes a main exposure and either or both of a bump exposure and a flash exposure.

Referring to FIG. 3, the main exposure is carried out as follows. An original is placed on an original table (not shown) of a process camera. A film 37 and a contact screen 36 put on the original 35 side of the film 37 are supported by a vacuum board (not shown) or the like above the original 35. A lens 11 for forming an image of the original on the film 37 is provided between the original 35 and the film 37. The space between lens holders supporting the lens 11 and the film 37 is light-shielded from the outside by bellows 8, thereby forming a dark space. A flash lamp 14, for use in a flash exposure which will be described later, is provided on the upper surface of the lens holder. A light source 19, for reflection, is provided at the side of the bellows 8 above the original. When the original 35 is transparent, for example film, a light source 38 below the original 35 is used.

The light emitted from the light source 19 is reflected by the original 35. The reflected light forms an image of the original 35 on the film 37. The flash lamp 14 is not used. An image is formed on the film 37 through the lens 11 through the contact screen 36. The image has various sizes of dots corresponding to the tones of the contrast of the image of the original 35.

The flash exposure makes contrast low between a shadow portion and a middle tone portion of an original. Referring to FIG. 4, in the flash exposure, the film 37 is uniformly exposed through the contact screen 36 by the flash lamp 14 provided on the lens holder of the bellows 8.

A bump exposure makes contrast high between a highlight portion and a middle tone portion of an original. Referring to FIG. 5, the contact screen is removed from the film 37. The original 35 is illuminated by the light source 19 or 38 and the reflected light or the transmitted light reaches the film 37.

Referring to FIG. 6, the flash exposure has the following effects. Suppose that a latent image shown by the curve 41 of FIG. 6 is formed through the main exposure. The flash exposure increases the exposure amount as shown by the broken curve 42. As a result, a part of the latent image reaches the integral exposure amount to form dots 43a and 43b. The dot 43b is a plan view of the formed dot. Only the dots of the middle to the lowest tone grow through the flash exposure. A shadow portion has a lower contrast and the screen range is enlarged.

Referring to FIG. 7, the bump exposure has the following effects. The exposure amount of the bump exposure is about 2-10% of the main exposure amount. In the bump exposure, as an original density is increased, a smaller amount of light is applied to a film. As a result, a middle tone portion and a highlight portion are exposed to a larger extent because the corresponding portions of the original have low densities. Therefore, the dot area of latent images 45a and 45b of the middle tone to the largest dot formed by the main exposure is increased, resulting in the dots having the larger area as latent images 44a and 44b. The bump exposure makes high the contrast in the highlight portion and reduces the screen range.

The bump exposure is especially effective for reproducing precise tones of highlight regions and for eliminating dots from a white portion as in a case of an illustration drawn on a piece of white paper (a highlight process).

In the above described sub-exposure method, a main exposure and one or both of a bump exposure and a flash exposure are properly combined thereby obtaining a halftone negative image reproducing contrast of an original with fidelity.

A conventional exposure control technique for implementing a sub-exposure method was proposed by the present assignee and was disclosed in *Printing Magazine* (1975, No. 8, Vol. 58, pp. 43-47) and another was disclosed in *Thirty-five Years of Image Techniques* (published on Oct. 11, 1978 pp. 93-99) published by the present assignee.

Referring to FIG. 9, a conventional exposure control apparatus includes a halftone photographing data input unit 121 capable of inputting and setting basic data and original data and an exposure control unit 125 for controlling a lamp 19 for illuminating original and a flash lamp 14 based on the basic data and the original data.

The halftone photograph data input unit 121 includes a main exposure basic data memory 123a for storing basic data for main exposure, a bump exposure basic data memory 123b for storing basic data for bump exposure, a flash exposure basic data memory 123c for storing basic data for flash exposure and an original data input unit 122 for storing original data.

Referring to FIGS. 8 and 9, for example, the basic data for the main exposure includes a basic main exposure time $T_{BM}$ for reproducing a predetermined reference original in a desired dot percentage, and densities $B_{H0}$ and $B_{S0}$. The densities $B_{H0}$ and $B_{S0}$ correspond to a dot percentage $A_H$ of a highlight region of the reference original and a dot percentage $A_S$ of a shadow portion, respectively, for halftone photography using the basic main exposure time $B_{BM}$. In general, 95% and 5% are considered desired values for $A_H$ and $A_S$, respectively.

The dot percentage represents a ratio of a halftone dot area to a unit area of an image formed on a film. If a screen range of a contact screen is $B_{DR}$, the equation $$B_{DR} = B_{S0} - B_{H0}$$

is established.

According to the tone characteristic curve 46 of the main exposure ($T_{BM}$) in FIG. 8, the reference original can be reproduced in the density range of $B_{H0} - B_{S0}$. As indicated by the curve 48, the maximum value of the density of the reproducible reference original is increased to $B_{S1}$ through the flash exposure ($T_{BF}$). On the other hand, as indicated by the curve 47, the minimum value of the density of the reproduced reference original is increased to $B_{H1}$.

The basic data for a bump exposure includes a basic bump exposure time $T_{BH}$ and a reference original density $B_{H1}$. The reference original density $B_{H1}$ corresponds to an obtained dot percentage $A_H$ of a highlight region when subjected to a bump exposure for the basic bump exposure time $T_{BH}$ after the halftone photography exposure for the basic main exposure time $T_{BM}$.

The basic data for flash exposure includes a basic flash exposure time $T_{BF}$ and a reference original density $B_{S1}$. The reference original density $B_{S1}$ corresponds to an obtained dot percentage $A_S$ of a shadow region when subjected to a flash exposure for the basic flash exposure time $T_{BF}$ after the halftone photography exposure for the basic main exposure time $T_{BM}$.

The original data includes a density $D_H$ (a highlight density) of a highlight region of an original and a density $D_S$ (a shadow density) of a shadow region at which a highlight dot percentage $A_H$ and a shadow dot percentage $A_S$ are respectively obtained as a result of the halftone photography. A difference ($D_S - D_H$) between the shadow density $D_S$ and the highlight density $D_H$ denotes an original range $D_{DR}$.

The exposure control device 125 includes an exposure operating device 127 for calculating a main exposure amount $T_M$, a bump exposure amount $T_H$ and a flash exposure amount $T_F$ based on the basic data and the original data to control an exposure of the process camera.

The process camera includes an autofocus control circuit (not shown) and an automatic focusing device (not shown) for automatically adjusting focus based on set magnification m. The autofocus control circuit includes the autofocus operating device. The magnification m is applied from the autofocus control circuit to an exposure operating device 127. An f-number $F_{N0}$ and basic data $T_0$ for a line exposure are also accepted by the exposure operating device 127 to carry out an exposure operation.

The conventional exposure control apparatus operates as follows. The basic data and the original data are applied to the halftone data input unit 121. The exposure operating device 127 obtains the main exposure time $T_M$, and one or both of the flash exposure time $T_F$ and the bump exposure time $T_H$ through the operations based on the equations (3)-(6) set forth below. A prescribed exposure control is carried out based on the obtained values $T_M$, $T_F$ and $T_H$.

The operations of the values $T_M$, $T_F$ and $T_H$ are separately performed in the following two cases depending on a relation between the original range and the screen range.

(I) When the original range is larger than the screen range ($D_{DR} > B_{DR}$), operations are as follows.

With reference to FIG. 8, the screen range is from $B_{H0}$ to $B_{S0}$. It is assumed that the original range $D_{DR}$ ($=D_S - D_H$) corresponds to the reference original density of $B_{H0} - B_{S1}$.

In this case, there is only one way of forming a dot with a dot percentage of $A_H$ on a portion of dot image corresponding to the point $D_H$ ($=B_{H0}$) of the original and a dot with a dot percentage of $A_S$ on a portion of the dot image corresponding to the point $D_S$ ($=B_{S1}$) of the original. That is, a main exposure amount is appropriately adjusted to form a dot with a dot percentage $A_H$ corresponding to the point $D_H$ ($=B_{H0}$) of the original. At this time, dots corresponding to the point $D_S$ ($=B_{S1}$) of the original are scarcely formed, with reference to FIG. 8. Further flash exposure results in a formation of a dot with a dot percentage $A_S$ corresponding to the point $D_S$ ($=B_{S1}$) of the original. At this time, the already formed dot with the dot percentage $A_H$ remains of the same size. That is the only way to reproduce an original having a range larger than the screen range in appropriate contrast.

At this time, the values $T_M$ and $T_F$ can be obtained as described in the following:

$$T_M = T_{BM} \cdot 10^A \qquad (3)$$

wherein $A = D_H - B_{H0}$, and $$T_F = T_{BF}(1 - 10^{-C})/(1 - 10^{-F}) \qquad (4)$$

wherein $C = (D_S - D_H) - (B_{S0} - B_{H0}) = D_{DR} - B_{DR}$, and $F = B_{S1} - B_{S0}$.

(II) When the original range is smaller than the screen range ($D_{DR} < B_{DR}$), operations are as follows.

As shown in FIG. 8, the screen range is from $B_{H0}$ to $B_{S0}$. It is assumed that the original range $D_{DR}$ ($=D_S - D_H$) corresponds to the reference original density of $B_{H1}$ to $B_{S0}$.

In this case, there is only one way of forming a dot with a dot percentage $A_H$ corresponding to the point $D_H$ ($=B_{H1}$) of the original and a dot with a dot percentage $A_S$ corresponding to the point $D_S$ ($=B_{S0}$) of the original.

A dot with a dot percentage $A_S$ is formed at the corresponding point $D_S$ ($=B_{S0}$) of the original by appropriately adjusting the main exposure amount. At this time, the dot percentage of the dot formed corresponding to the point $D_H$ ($=B_{H1}$) of the original is smaller than $A_H$. Further bump exposure results in a formation of a dot with the dot percentage $A_H$ corresponding to the point $D_H$ ($=B_{H1}$) of the original. At this time, the already formed dot with the dot percentage $A_S$ remains of the same size. This is the only way to reproduce the original having a range smaller than the screen range in appropriate contrast.

Herein, the values $T_M$ and $T_H$ can be obtained in a manner as described in the following:

$$T_M = T_{BM} \cdot 10^B \qquad (5)$$

wherein $B = D_S - B_{S0}$, and $$T_H = T_{BH} \cdot 10^D \cdot (1 - 10^C)/(1 - 10^{-E}) \qquad (6)$$

wherein $C = (D_S - D_H) - (B_{S0} - B_{H0})$, $D = D_H - B_{H1}$ and $E = B_{H1} - B_{H0}$.

In actuality, corrections corresponding to the magnification m and a change of the common f-number $F_{N0}$ are added to these equations.

Theoretically the above-described conventional exposure control system has no problem, provided that the exposure and the development can be strictly controlled. However, quality of photosensitive material varies in sensitivity from one production lot to the next. Also, in an automatic development, activity of developer used therein varies to some extent. Furthermore, it is sometimes difficult to accurately measure a highlight area density or a shadow area density of the original data. Consequently, it may not be possible to obtain desired dot percentages $A_H$ and $A_S$ of the portions corresponding to the highlight region and the shadow region of the halftone negative image obtained based on the basic data and original data.

For the purpose of correction, according to the above-described conventional method, basic data is obtained whenever necessary or an appropriate exposure time is reestimated based on the exposure result to repeat halftone photographing again. The basic data, however, includes the large amount of data as described above and it requires much time to obtain basic data whenever the necessity arises. This operation requires technical knowledge of density of an original and a contact screen for use. Appropriate estimation of exposure time is made based on experience. It is not possible for an operator lacking experience to obtain good reproduction.

SUMMARY OF THE INVENTION

One object of the present invention is to provide a method of controlling exposure and an apparatus therefor by which substantially desired dot percentages can be easily obtained at the portions corresponding to a highlight region and a shadow region through rephotographing requiring an operator to reobtain basic data and reestimate appropriate exposure time when desired dot percentages $A_H$ and $A_S$ cannot be obtained.

Another object of the present invention is to obtain a method of controlling exposure and an apparatus therefor which can reduce an exposure correction amount in halftone photographing in order to compensate for factors affecting a desired exposure amount in a long period of time, for example, a state of liquid for processing a photosensitive material.

The method of the present invention prepares basic data obtained relative to a predetermined reference original and a screen and original data, prepares data for correction for determining a correction amount of the original data for obtaining dot image having desired contrast, obtains a first dot image of the original by the exposure amount determined based on the basic data and the original data, obtains a dot percentage difference $\delta_H$ between a dot percentage of a highlight region of the first dot image and a desired highlight dot percentage and a dot percentage difference $\delta_S$ between a dot percentage of a shadow region and a desired shadow dot percentage, obtains a correction amount of the original data for obtaining desired highlight dot percentage and shadow dot percentage based on the dot percentage differences $\delta_H$ and $\delta_S$ and the data for correction, thereby updating (modifying and replacing) the basic data based on the obtained correction amount of the correction data, and obtains an exposure amount for obtaining second dot image having desired contrast based on the updated basic data and the original data.

According to the method, the first dot image of the original is obtained by the exposure amount determined based on the previously prepared basic data and original data. Then the dot percentage differences $\delta_H$ and $\delta_S$ of the highlight region and the shadow region, respectively, of the first dot image are obtained. $\delta_H$ and $\delta_S$ are used to find a correction amount of the original data for obtaining desired contrast, based on which correction amount the basic data is corrected and updated. The exposure amount for obtaining the second dot image having desired contrast is obtained based on the updated basic data and the original data.

The dot percentage differences $\delta_H$ and $\delta_S$ are necessary for correcting the exposure amount. The differences, represented by percentages, can be easily obtained by measuring dot percentages of a highlight region and a shadow region of the first dot image. The conventional complicated, but not definite procedure is not required for estimating a correction amount of original data based on the first dot image. Basic data is updated based on the obtained correction amount of the original data so as to compensate for the dot percentage differences. Because the correction amount of the basic data is already taken into consideration when obtaining the first dot image in the subsequent photographing, the correction amount decreases.

According to another aspect of the present invention, the exposure control apparatus includes a basic data memory for storing basic data obtained with respect to a predetermined reference original and a screen, and original data; a correction data memory for storing data for correction for determining the correction amount of the original data for obtaining dot image having desired contrast; measuring device for measuring a dot percentage difference $\delta_H$ between a dot percentage of a highlight region of first dot image obtained by photographing the original by using the exposure amount determined based on the basic data and the original data and a desired highlight dot percentage, and a dot percentage difference $\delta_S$ between a dot percentage of a shadow region and a desired shadow dot percentage; basic data updating device for obtaining a correction amount of the original data for obtaining second dot image having desired contrast based on dot percentage differences $\delta_H$ and $\delta_S$ and the data for correction to update the basic data based on the obtained correction amount of the original data; and exposure amount re-calculating device for finding an exposure amount for obtaining the second dot image having desired contrast based on the updated basic data and the original data.

In the exposure control apparatus, the basic data and the original data are stored in the basic data memory, while the data for correction is stored in the correction data memory. Respective dot percentage differences $\delta_H$ and $\delta_S$ between dot percentages of the highlight region and the shadow region of the first dot image and desired dot percentages are measured to find a correction amount of the original data for obtaining second dot image having desired contrast. The basic data is updated by the basic data updating device based on the obtained original data correction amount. The exposure amount for obtaining the second dot image is calculated by the exposure amount recalculating device based on the updated basic data and the original data.

Only measurement of the dot percentage differences $\delta_H$ and $\delta_S$ of the first dot image by the measuring device is necessary for obtaining dot image having desired contrast. Such a process is unnecessary as estimating a correction amount of desired original data based on the first dot image, which makes a determination of the correction amount easy. The basic data is updated so as to compensate for the obtained correction amount of the original data. Therefore, if such correction is affected by a factor varying the exposure amount for a long period of time, subsequent halftone photographing will require a reduced correction amount.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described with reference to the drawings in the following.

Figure 1:
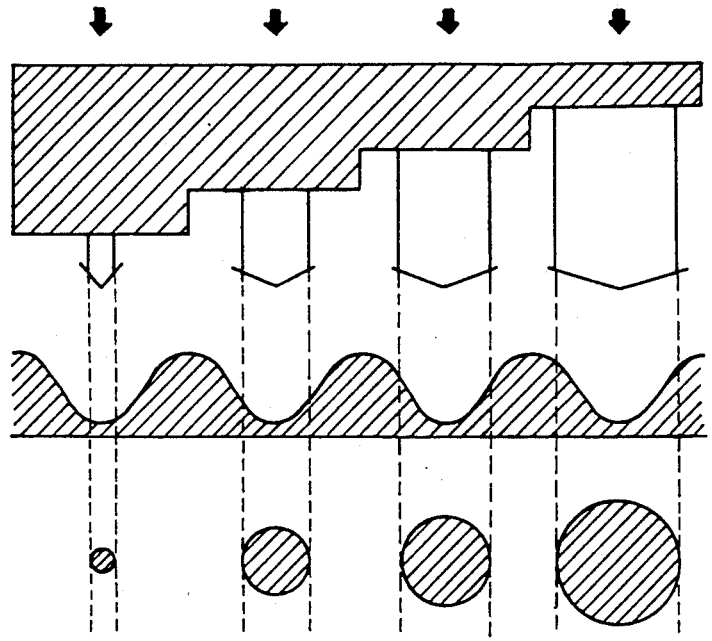
FIG. 1 is a schematic diagram illustrating the principle of halftone photography using a contact screen.
Figure 2:
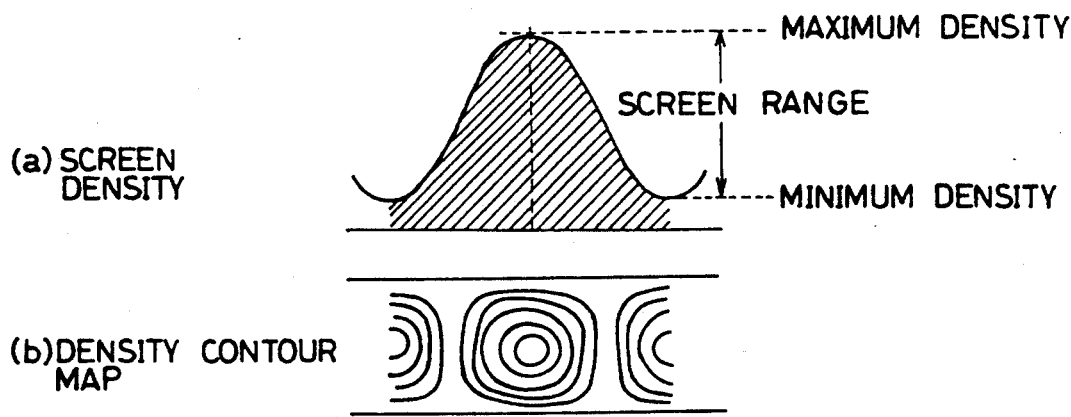
FIG. 2 is a schematic diagram of a density distribution of the contact screen.
Figure 3:
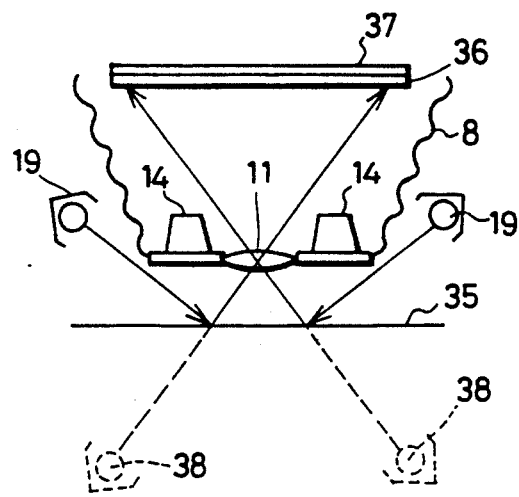
FIG. 3 is a schematic diagram showing the principle of the main exposure.
Figure 4:
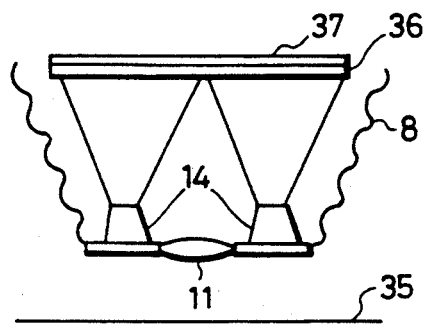
FIG. 4 is a schematic diagram showing the principle of the flash exposure.
Figure 5:
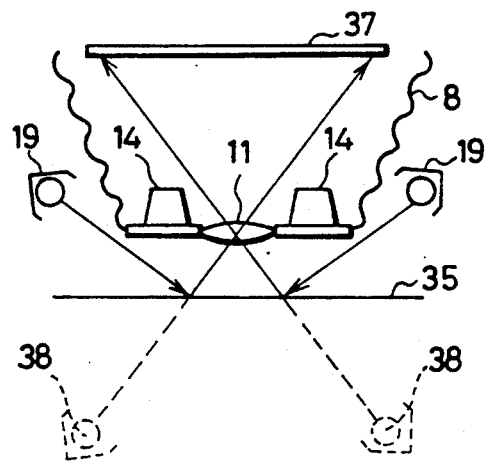
FIG. 5 is a schematic diagram showing the principle of the bump exposure.
Figure 6:
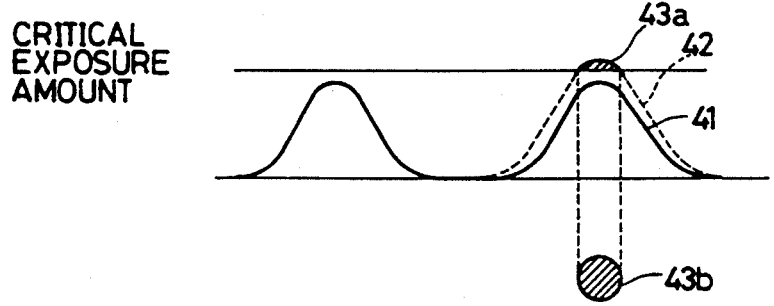
FIG. 6 is a diagram showing the principle of formation of a dot by a flash exposure.
Figure 7:
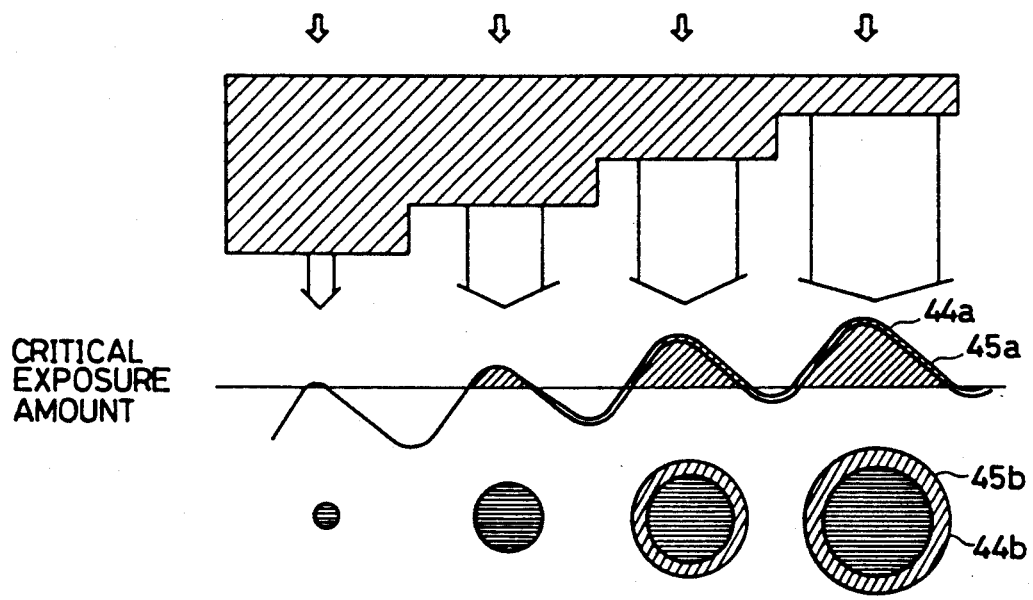
FIG. 7 is a schematic diagram showing the principle of formation of a dot by a bump exposure.
Figure 8:
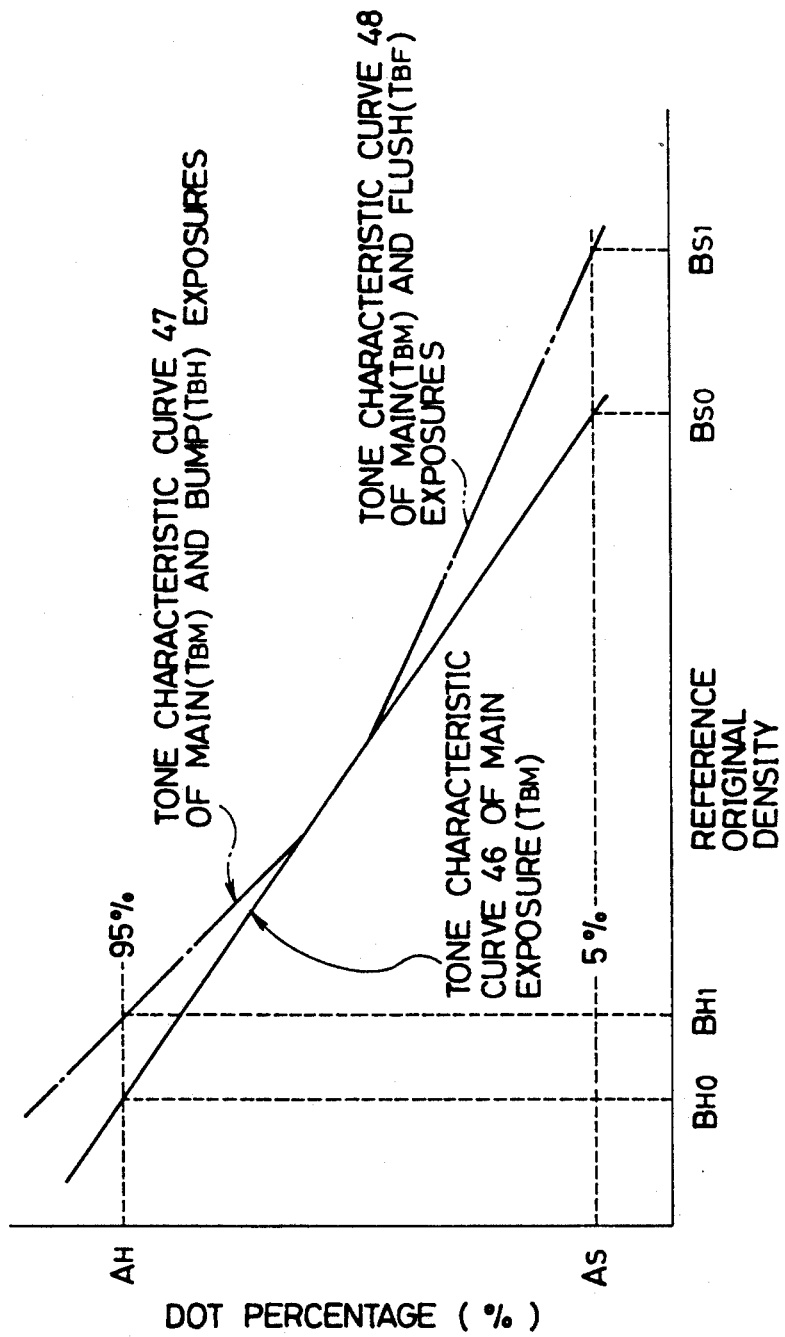
FIG. 8 is a graph showing tone characteristic curves of a main exposure, a bump exposure and a flash exposure for a negative photosensitive material.
Figure 9:
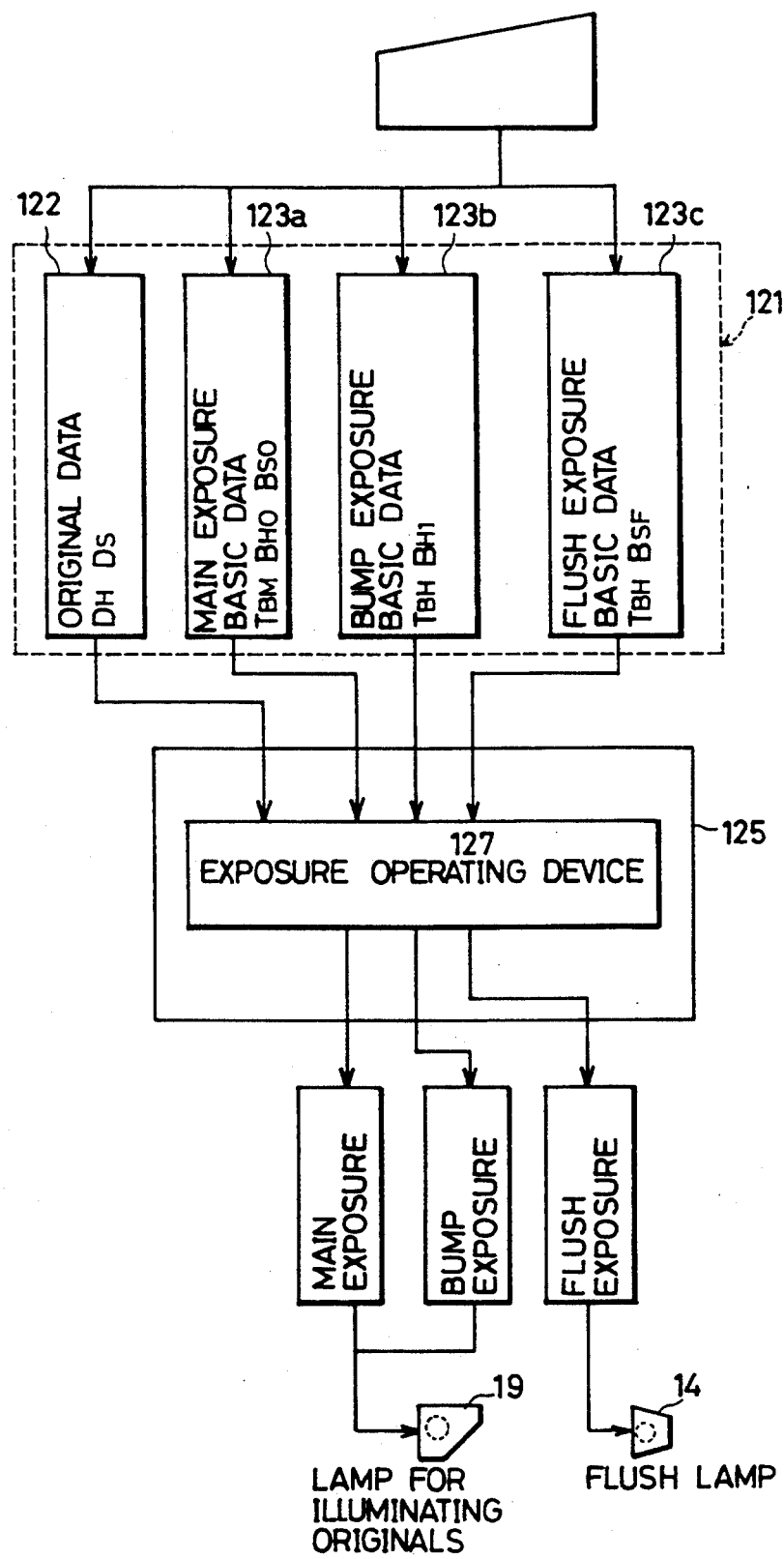
FIG. 9 is a block diagram of a conventional apparatus for controlling exposure.
Figure 10:
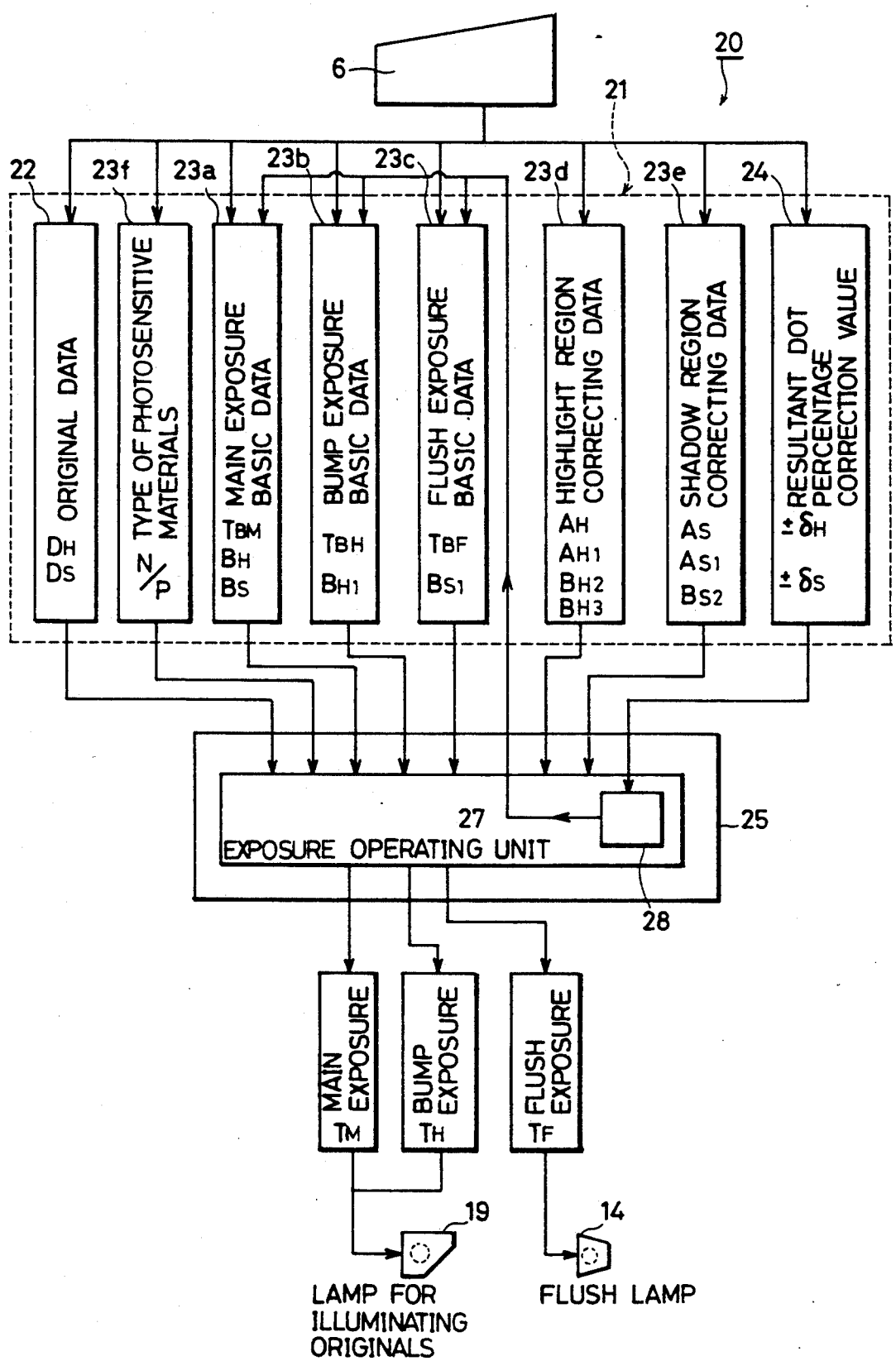
FIG. 10 is a block diagram of an apparatus for controlling exposure according to the present invention.
Figure 11:
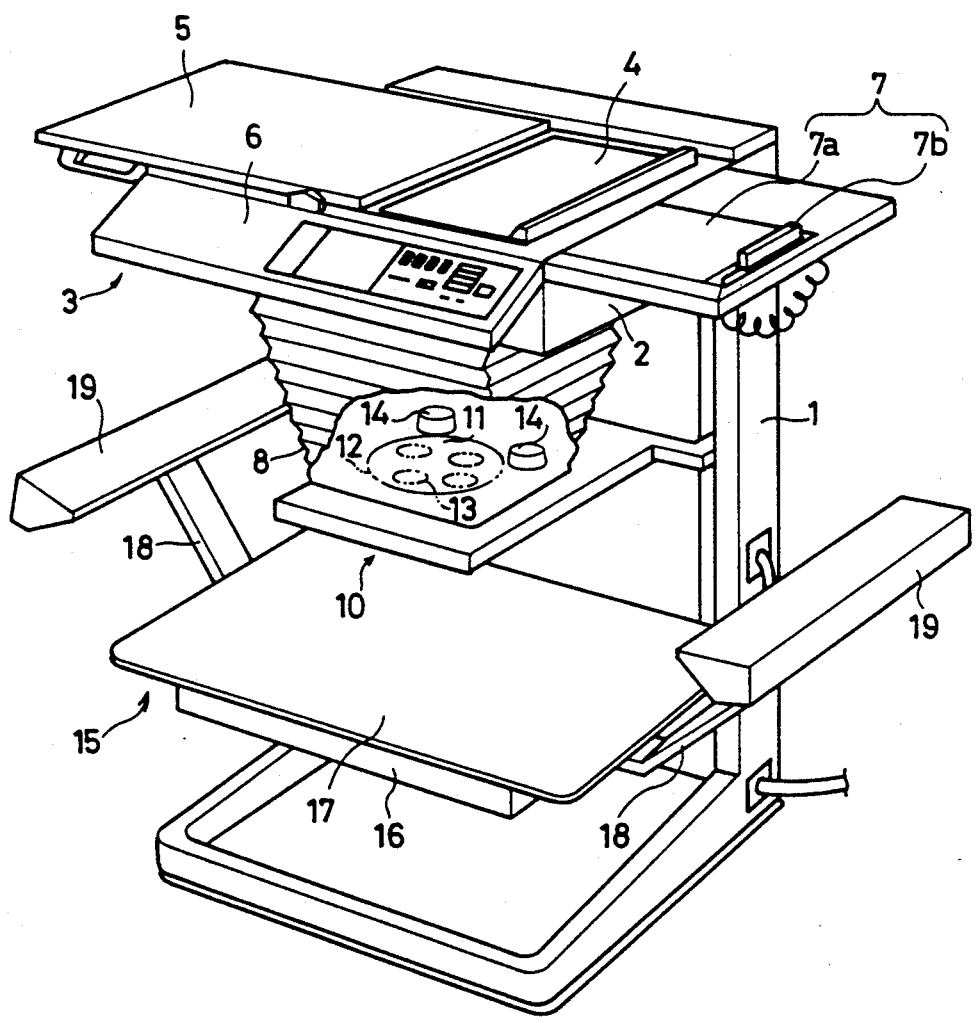
FIG. 11 is a perspective view of a process camera for implementing the method of controlling exposure according to the present invention.

FIG. 10 is a block diagram showing an exposure control apparatus according to the present invention and FIG. 11 is a perspective view of a vertical process camera comprising the exposure control apparatus. The vertical process camera will be briefly described.

FIG. 11 is a perspective view of a vertical process camera including the exposure control apparatus according to the present invention. The vertical process camera includes an L-shaped base frame 1. An open frame 2 is provided at the top of the base frame 1 protruding therefrom and having an opening, and an exposure frame 3 is provided on the open frame 2. A lens holder 10 is attached to the frame 1 in a vertically movable manner below the open frame 2. Bellows 8 provides light shielding of the space between the lens holder 10 and the open frame 2 from the outside. The operator places original on frame 15 attached in a vertical movable manner to the base frame 1 below the lens holder 10.

The exposure frame 3 includes a glass plate 4 provided at the right side of the upper surface of the open frame 2 and a vacuum board 5 provided leftward of the upper surface of the open frame 2. An operation panel 6 provided at the front portion of the exposure frame 3 contains an exposure control apparatus according to the present invention. A densitometer 7 provided at the rightside portion of the open frame 2 measures a density and a dot percentage of each part of an original and a density and a dot percentage of a halftone dot image.

The glass plate 4 is rotatable around its right side, and the vacuum board 5 is rotatable around an axis of rotation provided slightly leftward from the center of the opening provided on the open frame 2. The glass plate 4 and the vacuum board 5 can alternately cover the opening of the open frame 2 to be placed on the surface on which the image of the original is formed.

A detachable lens 11 is attached at the center of the lower surface of the lens holder 10 for covering a predetermined magnification. Provided in the lens holder are a filter turret 12 having a plurality of color separation filters 13 and a pair of flash lamps 14 for a flash exposure.

The original frame 15 includes an original table 16 attached up-down in a vertically movable manner to the base frame 1 on which an original is to be placed and a glass plate 17 for pressing the original placed on the original table 16. A pair of light sources 19 for reflection are attached to the original table 16 by arms 18, and a light source for transmission (not shown) is provided under the original table 16.

An appropriate combination of the positions of the original table 16, the lens holder 10, and the types of the lens 11 allows photographing of an original at a desired magnification and exposure of the image of the original to a film held on the vacuum holder 5.

An exposure control apparatus according to the present invention will be described in the following.

A main exposure control device 20 connected to an operation panel 6 includes a halftone photographing data setting unit 21. The halftone photographing data can be set by the operation panel 6. The device also includes an exposure control unit 25, as shown in FIG. 10.

The halftone photographing data setting unit 21 includes an original data setting unit 22, basic data setting units 23a–23c, a highlight region correcting data setting unit 23d, a shadow region correcting data setting unit 23e, a negative/positive type of photosensitive material setting unit 23f and a resultant dot percentage correction value setting unit 24. There is provided an exposure operating unit 27 which includes a basic data updating unit 28. The unit 28 controls exposure based on each updated basic data.

The basic data set to each of the basic data setting units include main exposure basic data ($T_{BM}$, $B_{H0}$, $B_{S0}$), bump exposure basic data ($T_{BH}$, $B_{H1}$) and flash exposure basic data ($T_{BF}$, $B_{S1}$) according to types of a screen and a photosensitive material.

Data ($A_H$, $A_{H1}$, $B_{H2}$, $B_{H3}$) for correcting a highlight region and data ($A_S$, $A_{S1}$, $B_{S2}$) for correcting a shadow region are input in addition to the basic data. Both of the additional data for correction are used for converting the resultant dot percentage correction values $\delta_H$ and $\delta_S$ into original density correction values J1 and J2 as will be described later. The values, $B_{H2}$, $B_{H3}$, $A_{S1}$ and $B_{S2}$ will be described later, while the other values are the same as those described in "Description of the Related Art."

The resultant dot percentage correction values $\pm\delta_{H1}$ and $\pm\delta_S$ (%) set to the resultant dot percentage correction value setting unit 24 represent, in percentage, the excessive or insufficient amounts with respect to a desired value in a case where a desired highlight region dot percentage $A_H$ cannot be obtained or where a desired shadow region dot percentage $A_S$ cannot be obtained. $\delta_H$ denotes a resultant dot percentage correction value corresponding to a highlight region of the original, while $\delta_S$ denotes a resultant dot percentage correction value corresponding to a shadow region of the original. These values are represented by dot percentages because one in the field of processing work can more easily recognize the required correction represented in the dot percentages, and such representation is practical for processing work.

Exposure control of a negative type photosensitive material is conducted as follows.

In a case where desired dot percentages $A_H$ and $A_S$ cannot be obtained respectively at a portion of the photosensitive material corresponding to a highlight region of the original and at a portion of the photosensitive material corresponding to a shadow region, desired dot percentages can be obtained by modifying original data $D_H$ and $D_S$ based on equations (7) and (8), respectively.

$$D_{H1} = D_H + J1, \quad (7)$$

(wherein $J1 = \pm K_H \cdot \delta_H$)

$$D_{S1} = D_S + J2, \quad (8)$$

(wherein $J2 = \pm K_S \cdot \delta_S$)

Herein, $K_H$ and $K_S$ denote correction coefficients for converting the resultant dot percentage correction values $\delta_H$ and $\delta_S$ into original density correction values J1 and J2, which coefficients are determined as follows.

Figure 12:
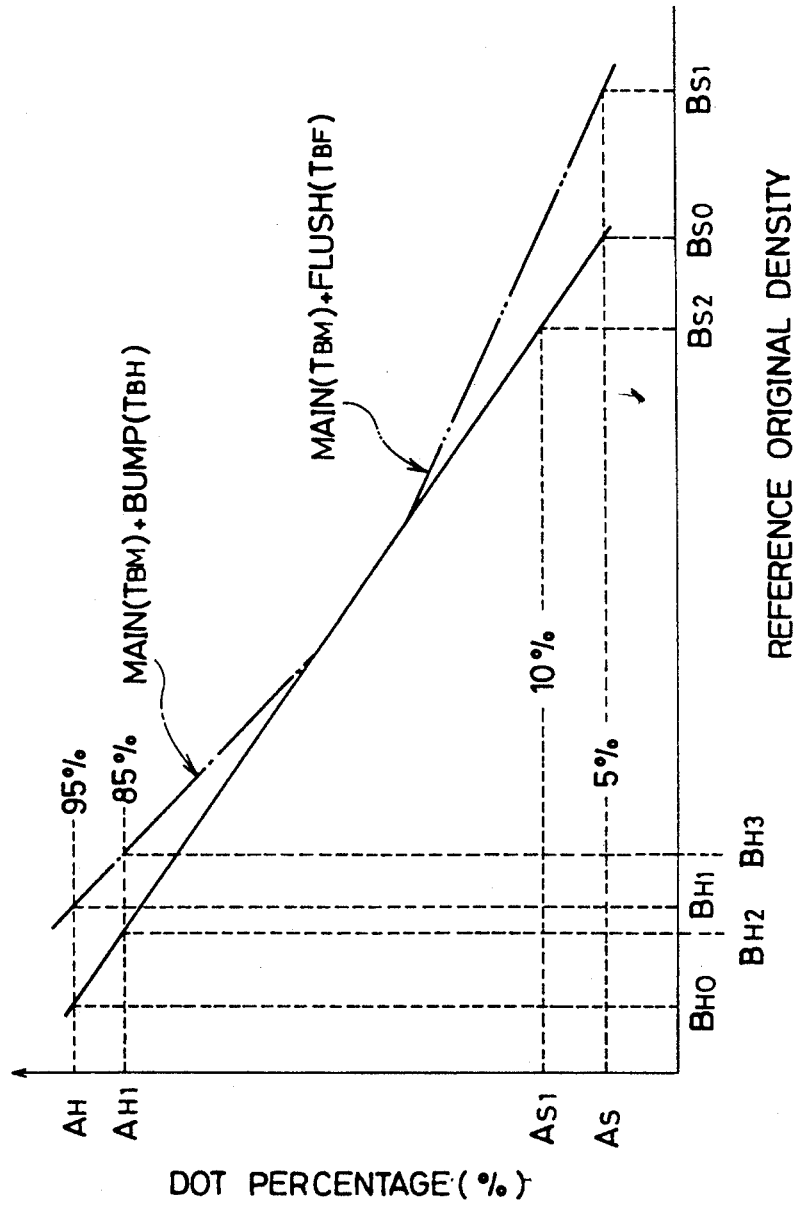
FIG. 12 is a graph showing tone characteristic curves, describing the method of controlling exposure according to the present invention, for a negative photosensitive material.

As shown in FIG. 12, in addition to the desired dot percentages $A_S$ (for example, 95%) and $A_S$ (for example, 5%), a dot percentage $A_{H1}$ (for example, 85%) little smaller than $A_H$ and a dot percentage $A_{S1}$ (for example, 10%) little larger than $A_S$ are selected with respect to the portion corresponding to the highlight region and the portion corresponding to the shadow region, respectively. Draw straight lines starting from the ordinate representing those dot percentages and in parallel to the abscissa. The intersection points between these lines and the respective tone characteristic curves denote respective reference original density values $B_{H0}$, $B_{H1}$, $B_{H2}$, $B_{H3}$ and $B_{S0}$, $B_{S1}$, $B_{S2}$. These values are used to determine J1 and J2.

If $D_{DR}$ is greater than $B_{DR}$, the highlight region correction coefficient $K_H$ is defined by the following equation (9) with reference to the tone characteristic curve of main exposure ($T_{BM}$).

$$K_H = (B_{H2} - B_{H0})/(A_{H1} - A_H) \quad (9)$$

If $D_{DR}$ is smaller than $B_{DR}$, the coefficient $K_H$ is similarly defined by the following equation (10) with reference to the tone characteristic curve of main exposure ($T_{BM}$)+bump exposure ($T_{BH}$).

$$K_H = (B_{H3} - B_{H1})/(A_{H1} - A_H) \quad (10)$$

The shadow region correction coefficient $K_S$ is defined by the following equation (11) with reference to the tone characteristic curve of main exposure ($T_{BM}$).

$$K_S = (B_{S0} - B_{S2})/(A_S - A_{S1}) \quad (11)$$

These correction coefficients $K_H$ and $K_S$ are hardly dependent on sensitivity of a photosensitive material and activity of a developer. They are dependent on a type of the particular contact screen alone. Therefore, the correction coefficients can be calculated from the above respective basic data for each particular screen.

It should be noted that if $D_{DR}$ is smaller than $B_{DR}$, the correction coefficient $K_H$ of equation (8) varies according to a ratio of the basic main exposure time $T_{BM}$ to the basic bump exposure time $T_{BH}$. In order to perform more precise exposure, therefore, the following operations are necessary. First, several bump exposure times $T_{BH}$ are selected for one main exposure time $T_{BM}$ and density ranges ($B_{S0} - B_{H1}$) and $K_H$s are obtained from the respective tone characteristic curves. Out of the obtained $K_H$s, one $K_H$ is selected which corresponds to one of the above-described density ranges closest to the original density range $D_{DR}$.

Obtaining the above-described correction coefficients $K_H$ and $K_S$ requires input of the data for correcting a highlight region and a shadow region in addition to the basic data required in the conventional method and the conventional apparatus. It has been ascertained that if predetermined (constant) values are prepared and appropriate one is selected, it is not necessary to calculate $K_H$ and $K_S$ for each exposure by using equations (9)–(11). In such a case, it is possible to save such process as described above. Such alternative presents no problem in practice. Also in this case, it is proposed to store several predetermined values for $K_H$ in a storage portion (not shown), to read out one of these values according to the density range $D_{DR}$ of the original and to calculate $K_H$ using the read value in order to achieve more precise exposure control.

A basic data updating unit 28 in the exposure operation unit 27 converts the above-described resultant dot percentage correction values into said original density correction values J1 and J2. Thereafter, the basic data updating unit 28 updates the main exposure basic data, the bump exposure basic data and flash exposure basic data based on the original density correction values J1 and J2. The following is a description of a manner of updating the basic data based on the original density correction values J1 and J2. The main exposure amount $T_M$ and the bump exposure amount $T_H$ can be corrected by only substituting $D_{H1}$ and $D_{S1}$ obtained from equations (7) and (8) for $D_H$ and $D_S$ of equations (3), (5) and (6), respectively. Correction of the flash exposure amount $T_F$, however, requires the following equation (14) which is the modified equation (4) as described in the following.

(a) In a case where an original density range is larger than a screen density range ($D_{DR} > B_{DR}$):

For the main exposure $T_M$, the following equation is obtained by substituting $D_{H1}$ found by equation (7) for $D_H$ in equation (3).

$$T_M = T_{BM} \cdot 10^{A1} \text{ (wherein, } A1 = D_H + J1 - B_{H0}) \quad (12)$$
$$= T_{BM} \cdot 10^{J1} \cdot 10^A$$

($A = D_H - B_{H0}$, $J1 = K_H \cdot \sigma_H$, which are also the case with the following)

The comparison between equation (12) and equation (13) reveals that the two equations coincide with each other in expression if main exposure basic data $T_{BM}$ is replaced in accordance with the following equation.

$$T_{BM} \equiv T_{BM} \cdot 10^{J1} \quad (13)$$

Herein, the symbol "≡" signifies definition or replacement of the data of the term on the left side based on the operation result on the right side using the late value.

In equation (4) for the flash exposure amount $T_F$, the value ($D_S - D_H$) of $D_{DR}$ in C is changed according to equations (7) and (8). Such a small change does not enable a desired dot percentage to be obtained at the portion corresponding to the shadow region because sensitivity of a photosensitive material and activity of a developer for an automatic developing machine vary at the time point at which the basic data is obtained and at the time point at which the actual exposure is performed. Being affected by the foregoing, there is a case where a desired dot percentage cannot be obtained at the portion corresponding to the shadow region based only on the basic data. In this case, the basic flash exposure time $T_{BF}$ itself should be updated. The following equation (14) therefore should be introduced in place of equation (4).

$$T_F = T_{BF} \cdot 10^{J2} (1 - 10^{-C1})/(1 - 10^{-F}) \quad (14)$$

(wherein, $C1 = D_{DR} + J2 - J1 - B_{DR}$
$= D_{DR} - (B_{S0} + J1 - J2 - B_{H0})$,
$F = B_{S1} - B_{S0}$, $J2 = K_S \cdot \delta_S$, the same to be applied to the following)

Equation (14) coincides with equation (4) when $\delta_S = 0$.

The flash exposure basic data $T_{BF}$ and $B_{S0}$ will be updated based on the following equations.

$$T_{BF} = T_{BF} \cdot 10^{J2} \tag{15}$$

$$B_{S0} = B_{S0} + J1 - J2 \tag{16}$$

$B_{H0}$ remains the same. That is, $T_{BM}$ and $T_{BF}$ should be updated with $B_{H0}$ in each basic data fixed.

(b) In a case where the original density range is smaller than the screen density range ($D_{DR} < B_{DR}$):

For the main exposure amount Tx, the following equation will be obtained by substituting $D_{S1}$ found by equation (8) for $D_S$ in the equation (5).

$$T_M = T_{BM} \cdot 10^{B1} \tag{17}$$
$$(\text{wherein } B1 = D_S + J2 - B_{S0})$$
$$= T_{BM} \cdot 10^{J2} \cdot 10^{B}$$
$$(\text{wherein } B = D_S - B_{S0})$$

The main exposure basic data $T_{BM}$ is replaced based on the following equation in order to match equation (5) with equation (17) in expression.

$$T_{BM} = T_{BM} \cdot 10^{J2} \tag{18}$$

For the bump exposure amount $T_H$, the following equation will be obtained by substituting $D_{H1}$ and $D_{S1}$ found by equations (7) and (8) for $D_H$ and $D_S$ in equation (6).

$$T_H = T_{BH} \cdot 10^{D1} \cdot \{(1 - 10^{C1})/(1 - 10^{-E})\} \tag{19}$$
$$= T_{BH} \cdot 10^{J1} \cdot 10^{D} \{(1 - 10^{C1})/(1 - 10^{-E})\}$$
$$(\text{wherein } D1 = D_H + J1 - B_{H1},$$
$$C1 = D_{DR} + J2 - J1 - B_{DR}$$
$$= D_{DR} - \{B_{S0} - (B_{H0} + J2 - J1)\}, \text{ and}$$
$$E = B_{H1} - B_{H0})$$

It can be seen from the comparison of this equation with equation (6) that the bump exposure basic data $T_{BH}$ and $B_{S0}$ should be updated based on the following equations, respectively.

$$T_{BH} = T_{BH} \cdot 10^{J1} \tag{20}$$

$$B_{H0} = B_{H0} + J2 - J1 \tag{21}$$

$B_{S0}$ remains the same. That is, $T_{BM}$ and $T_{BH}$ should be updated with $B_{S0}$ in each basic data fixed.

In the foregoing description, updating basic data requires different equations depending on a relationship between the original density range $D_{DR}$ and the screen density range $B_{DR}$. However, such an operation does not make it possible to totally update the basic data for the main exposure, the flash exposure and the bump exposure by a single modification of the basic data. It is therefore more efficient and practical if the total basic data can be updated irrespective of the relationship between $D_{DR}$ and $B_{DR}$.

Possible factors changing the basic data include a variation in sensitivity of a photosensitive material according to a production lot and a variation in activity of a developer for use in developing process. While such factors might shift the tone characteristic curve of the main exposure in parallel to the axis of the original density, the curve does not change its form and $B_{DR}$ remains unchanged.

Therefore, when $D_{DR}$ is greater than $B_{DR}$, if the main exposure basic data $T_{BM}$ exceeds the initial $T_{BM}$, the bump exposure basic data $T_{BH}$ is supposed to be also excessive at the same rate as $T_{BM}$. Therefore, $T_{BH}$ can be updated based on equation (20) at the same time of the updating $T_{BM}$ as based on equation (13). This is also the case where $T_{BM}$ is insufficient with respect to the initial $T_{BM}$.

Similarly, when $D_{DR}$ is smaller than $B_{DR}$, $T_{BF}$ can be updated by equation (15) at the time of updating $T_{BM}$ and $T_{BH}$ by equations (18) and (20).

Furthermore, when the tone characteristic curve of the main exposure shifts in parallel to the axis of the original density without changing its the configuration, J1 is expected to coincide with J2. At this time, either one of equation (13) or (18) can be incorporated into the other.

Both of equations (16) and (21) result from the relationship between $C1 = D_{DR} + J2 - J1 - B_{DR}$ and $C = D_{DR} - B_{DR}$. It is therefore possible to incorporate either one of equation (16) or (21) into the other depending on which one of the equations (13) and (18) is adopted even if $J1 = J2$ is not established.

Exposure control for a positive type photosensitive material will be described in the following.

Figure 13:
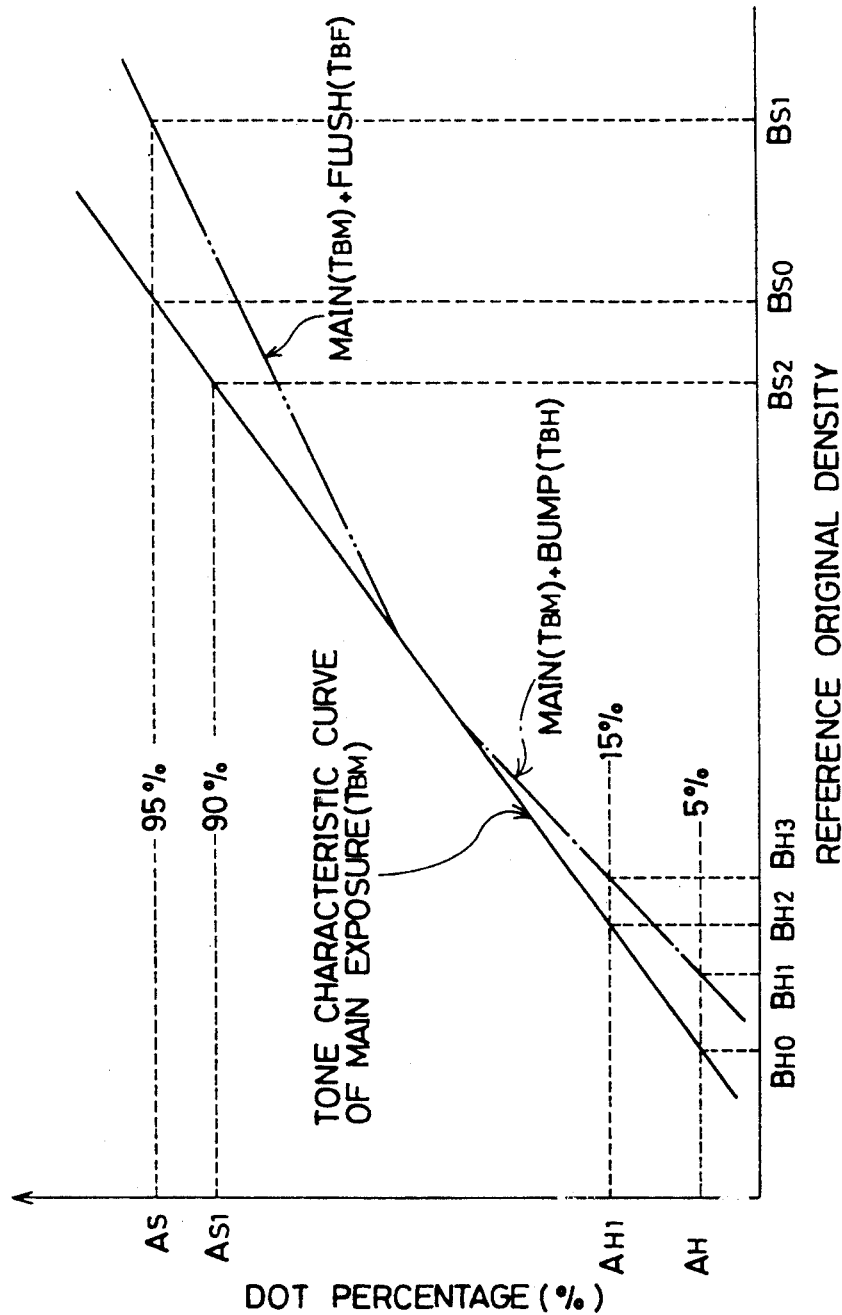
FIG. 13 is a graph showing tone characteristic curves of the main exposure, the bump exposure and the flash exposure for a positive photosensitive material.

FIG. 13 shows the respective basic data and tone characteristic curves for a positive type photosensitive material. As can be seen from the comparison between FIG. 13 and FIG. 12, a relationship between $A_H$ and $A_{H1}$ and a relationship between $A_S$ and $A_{S1}$ in equations (9), (10) and (11) for determining $K_H$ and $K_S$ are reversed depending on whether the photosensitive material is of negative type or positive type. The signs of $K_H$ and $K_S$ are also reversed.

An adequate correction can be therefore made by calculating the correction coefficients $K_H$ and $K_S$ using the equations (8), (9) and (10) each time without taking into consideration the type of the photosensitive material (positive or negative) although setting therefor is somewhat complicated.

The following is an operation for avoiding the complicated setting when $K_H$ and $K_S$ are set by using predetermined values. The type of the used photosensitive material is checked instead of inverting the signs of these values. In a case where the photosensitive material is of negative type, the signs of $K_H$ and $K_S$ should be inverted by the exposure operating unit 27. The absolute values of $K_H$ and $K_S$ are substantially determined by the particular screen to be used, with their signs changed according to the type (positive or negative) of the photosensitive material in use.

In practice, whether the photosensitive material is of negative type or of positive type, known operations are made according to these equations according to the changes of the photographing magnification and the lens aperture value.

Figure 14:
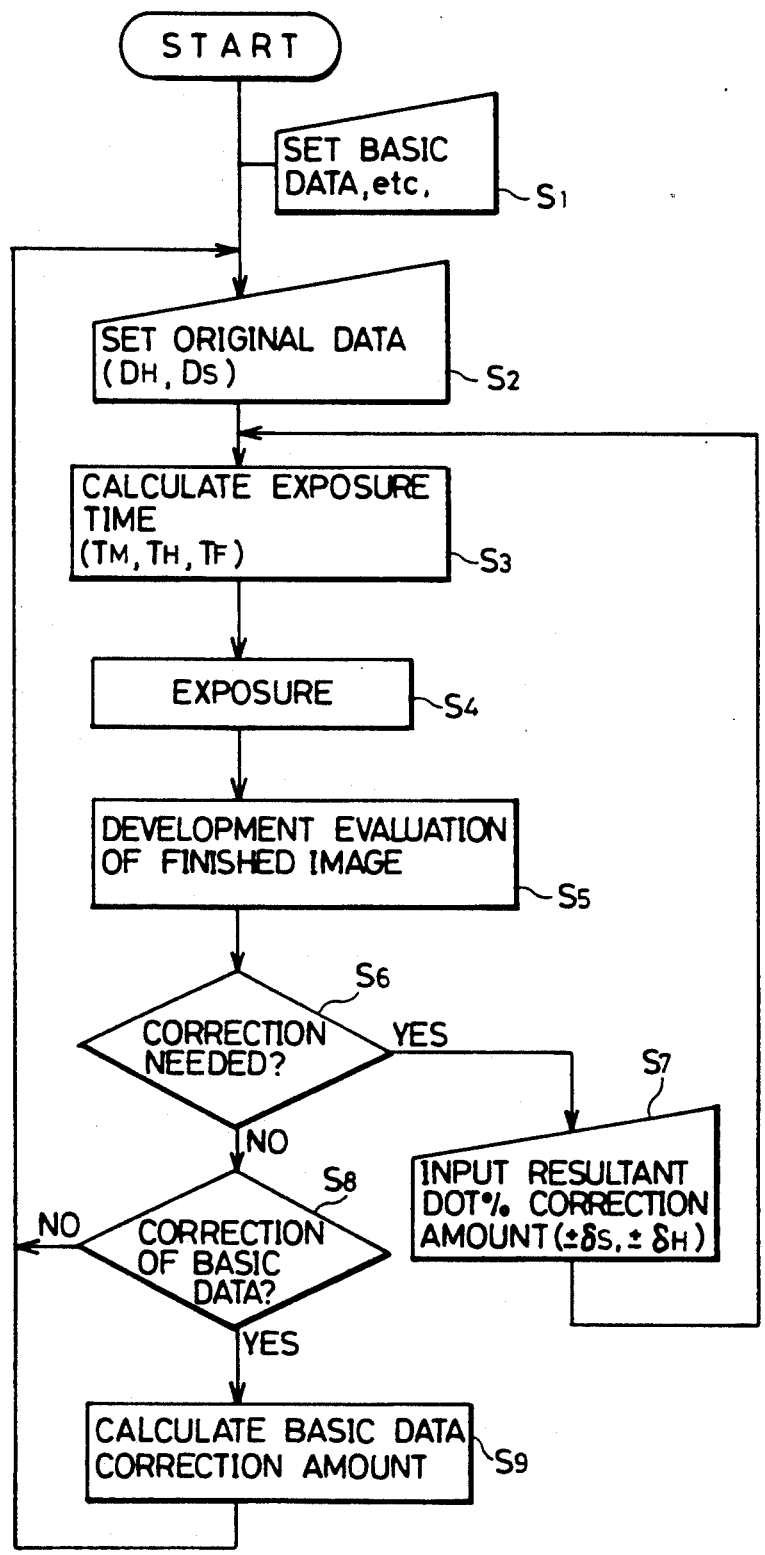
FIG. 14 is a flow chart showing the process steps of the method of controlling exposure according to the present invention.

FIG. 14 is a flow chart showing the steps of halftone photographing by the exposure control method according to the present invention. The steps of the halftone photographing will be described in the following.

In step S1, all of the above-described basic data and the data for correcting a highlight portion and the data for correcting a shadow region are set in advance.

In step S2, an original is put on the original frame 15 of the process camera (refer to FIG. 11). A photosensitive material is put on the film vacuum board 5 on which a screen is placed and attached thereon. The photosensitive material and the screen are located at an image forming plane by turning the film vacuum board.

Then original data ($D_H$ and $D_S$) and the photographing magnification are input by using an operation panel 6.

In step S3, an automatic focusing mechanism (not shown) is activated to shift the lens holder 10 and the original frame 15 to respective positions at which a desired magnification is achieved. The exposure operating unit 27 calculates the main exposure time $T_M$ and the flash exposure time $T_F$ or the bump exposure time $T_H$, the result of which is displayed at the display portion of the operation panel.

In step S4, a main exposure is started to turn on the lamp 19 for illuminating an original for a predetermined time period. Determination is made based on the above-described operation result as to whether a flash exposure or a bump exposure is required. When the determination is made that the flash exposure is necessary, the flash exposure is performed. If a bump exposure is necessary, the screen is removed and the bump exposure is conducted. The halftone photographing is thus once finished.

At step S5, the photosensitive material is developed. The densitometer 7 measures a resultant dot percentage for evaluating the finish. Determination is made in step S6 as to whether a correction should be made or not.

The halftone photographing of the original is completed if no correction is required.

If the correction is required, resultant dot percentage correction values $\pm\delta_H$ and $\pm\delta_S$ (%) are input in a dot percentage correction value setting unit 24 in accordance with an excessive or insufficient amount of the resultant dot percentage in step S7. Similarly to that of negative type, for a positive type photosensitive material, $\pm\delta_H$ and $\mp\delta_S$ can be set corresponding to an excessive or insufficient amount of the obtained dot percentage for a desired value. No updating of the basic data is made in step S7, thereby avoiding erroneous setting of original data and the like. At this stage, at least one of the main exposure amount, the flash exposure amount and the bump exposure amount is temporarily corrected. Then steps S3–S5 will be repeated again.

After performing steps S3–S5 again, if determination is made in step S6 that no correction is required, determination will be made in step S8 as to whether updating of the basic data is required or not. If the basic data should be updated, the respective basic data are updated based on the above-described correction values $\pm\delta_H$ and $\pm\delta_S$ (%) by using appropriate ones of said updating calculation equations (13), (15), (16), (18), (20) and (21) in step S9. Thereafter, an exposure time is calculated based on the updated basic data to carry out halftone photographing.

It is possible to skip step S8 and automatically update the basic data in step S9 immediately after inputting the resultant dot percentage correction values if there is little possibility of careless setting error of original data and the like, which is partly different from the flow chart of FIG. 14.

The foregoing embodiment is directed to the exposure control device contained in the vertical process camera. The present invention, however, is not limited thereto and is applicable to process cameras having different systems. The present invention is also applicable to a separate device for controlling exposure which is connected to process cameras of different types.

As is clear from the foregoing description, according to the present invention, when a desired dot percentage $A_H$ or a desired dot percentage $A_S$ cannot be obtained for the highlight or shadow region of the dot image, the excessive or insufficient amount of resultant dot percentage with respect to a desired value is used as a correction value and basic data is updated based on an original density correction value converted from the resultant dot percentage correction value. It is therefore unnecessary to obtain basic data every time halftone photographing is repeated, and it is unnecessary for an operator to make a complicated estimation as to an exposure time for another photographing from the result of previous halftone photographing. As a result, the operator is not required to update the exposure time, while approximately desired dots are obtained by a reduced number of steps for rephotographing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling exposure in a process camera, for obtaining dot image by exposing image of an original onto a photosensitive material through a screen, comprising the steps of:

preparing basic data obtained with respect to a predetermined reference original and the screen, and original data, preparing data for correction for determining a correction amount of said original data in order to obtain dot image having desired contrast, obtaining first dot image of said original by the exposure of an amount determined based on said basic data and said original data, obtaining a dot percentage difference $\delta_H$ between a dot percentage of a highlight region of said first dot image and a desired dot percentage of a highlight region, and a dot percentage difference $\delta_S$ between a dot percentage of a shadow region and a desired dot percentage of a shadow region, updating said basic data by obtaining a correction amount of said original data for acquiring second dot image having desired contrast based on said dot percentage differences $\delta_H$ and $\delta_S$ and said data for correction, and by said basic data being updated based on said obtained correction amount of the original data, and acquiring an exposure amount for obtaining said second dot image based on said updated basic data and said original data.

2. The method according to claim 1, wherein said basic data represent tone characteristics of dot image obtained by an exposure by using the screen and includes main exposure basic data, bump exposure basic data and flash exposure basic data.

3. The method according to claim 2, wherein
said main exposure basic data includes:
basic main exposure time $T_{BM}$,
respective densities $B_{H0}$ and $B_{S0}$ of a highlight region and a shadow region of said reference original, said densities $B_{H0}$ and $B_{S0}$ respectively corresponding to predetermined dot percentages $A_H$ and $A_S$ of a highlight region and a shadow region of dot image of said reference image acquired, said dot image of the predetermined reference image being obtained by an exposure of said basic main exposure time $T_{BM}$,
said bump exposure basic data includes:
basic bump exposure time $T_{BH}$, and density $B_{H1}$ of a highlight region of said reference original corresponding to a region having said dot percentage $A_H$ in dot image obtained as a result of a bump exposure of said basic bump exposure time $T_{BH}$ after the main exposure of said reference original of said basic main exposure time $T_{BM}$, said flash exposure basic data includes:
  basic flash exposure time $T_{BF}$, and
  a density $B_{S1}$ of a shadow region of said reference original corresponding to a region having said dot percentage $A_S$ in dot image obtained as a result of a flash exposure of said basic flash exposure time $T_{BF}$ after exposing said reference original for said basic main exposure time $T_{BM}$, and said original data includes:
  a density $D_H$ of a highlight region of said original, said highlight region being to be reproduced to have said dot percentage $A_H$, and
  a density $D_S$ of a shadow region of said original, said shadow region being to be reproduced to have said dot percentage $A_S$.

4. The method according to claim 3, wherein said step of preparing data for correction includes the steps of:
  preparing a highlight region correction coefficient $K_H$ for converting said dot percentage difference $\delta_H$ into a correction amount $J1$ of said density $D_H$ of the highlight portion of said original data in order to acquire said desired dot percentage $A_H$ for the highlight portion of said obtained dot image, and
  preparing a shadow region correction coefficient $K_S$ for converting said dot percentage difference $\delta_{S0}$ into a correction amount $J2$ of said density $D_S$ of the shadow region of said original data in order to acquire said desired dot percentage $A_S$ for the shadow portion of said obtained dot image.

5. The method according to claim 4, wherein said step of preparing the highlight region correction coefficient $K_H$ includes the steps of:
  preparing a first highlight region correction coefficient $K_H$ to be used in an exposure only by the main exposure, and
  preparing a second highlight region correction coefficient $K_H$ to be used in an exposure by the main exposure and the bump exposure.

6. The method according to claim 5, wherein said step of preparing the highlight region correction coefficient $K_H$ further includes the steps of:
  acquiring a density $B_{H2}$ of a region of said reference original, which region is to be reproduced to have a predetermined dot percentage $A_{H1}$ different from said dot percentage $A_H$ at the time of an exposure of said reference original by a main exposure of said basic main exposure time $T_{BM}$, and
  acquiring a density $B_{H3}$ of a region of said reference original, which region is to be reproduced to have said dot percentage $A_{H1}$ at the time of an exposure of said reference original by a main exposure of said basic main exposure time $T_{BM}$ and a bump exposure of said basic bump exposure time $T_{BH}$, said first highlight region correction coefficient $K_H$ being obtained by the following equation:

$$K_H = (B_{H2} - B_{H0})/(A_{H1} - A_H)$$

said second highlight region correction coefficient $K_H$ being obtained by the following equation:

$$K_H = (B_{H3} - B_{H1})/(A_{H1} - A_H).$$

7. The method according to claim 6, wherein said step of preparing the shadow region correction coefficient $K_S$ includes the steps of:
  obtaining a density $B_{S2}$ of a region of said reference original, which region is to be reproduced to have a predetermined dot percentage $A_{S1}$ different from said dot percentage $A_S$, at the time of an exposure of said reference original by a main exposure of said basic main exposure time $T_{BM}$, and
  finding said shadow region correction coefficient $K_S$ by the following equation:

$$K_S = (B_{S0} - B_{S2})/(A_S - A_{S1})$$

8. The method according to claim 7, wherein said step of updating the basic data includes the steps of:
  determining as to whether the bump exposure is necessary or not in order to obtain the dot image of said original having desired contrast,
  selecting either one of said first or second highlight region correction coefficients $K_H$s depending on the result of said determination step,
  acquiring said correction amounts $J1$ and $J2$ of the density $D_H$ of said highlight region and the density $D_S$ of said shadow region of said original, respectively, from the following equations:

$$J1 = \pm K_H \cdot \delta_H$$

$$J2 = \pm K_S \cdot \delta_S,$$

updating said main exposure time $T_{BM}$ based on either one of the following two equations, depending on the determination made by said determination step:

$$T_{BM} = T_{BM} \cdot 10^{J1}$$

$$T_{BM} = T_{BM} \cdot 10^{J2},$$

selecting either a combination of said basic flash exposure time $T_{BF}$ and said shadow density $B_{S0}$ or a combination of said basic bump exposure time $T_{BH}$ and said highlight density $B_{H0}$ depending on the result of said determination step to update the data of the selected combination based on the corresponding one pair of the following two pairs of equations:

$$T_{BF} = T_{BF} \cdot 10^{J2}$$

$$B_{S0} = B_{S0} + J1 - J2.$$

or $$T_{BH} = T_{BH} \cdot 10^{J1}$$

$$B_{H0} = B_{H0} + J2 - J1.$$

9. The method according to claim 8, wherein said determination step includes the steps of:
  comparing the density range of said original and the screen range of said screen, and
  determining as to whether said bump exposure is necessary or not according to the result of said density range comparing step.

10. The method according to claim 7, wherein said dot percentage $A_{H1}$ is set to be smaller than said dot percentage $A_H$.

11. The method according to claim 10, wherein said dot percentage $A_{S1}$ is set to be larger than said dot percentage $A_{S1}$.

12. The method according to claim 11, wherein said step of updating the basic data includes the steps of:
   determining as to whether the bump exposure is necessary or not in order to obtain said dot image of the original having desired contrast,
   selecting either one of said first and said second highlight region correction coefficients $K_Hs$ depending on the result of said determination step,
   acquiring said correction amounts J1 and J2 of the density $D_H$ of said highlight region of said original data and the density $D_S$ of said shadow region of said original data, respectively, based on the following equations:

$$J1 = \pm K_H \cdot \delta_H$$

$$J2 = \pm K_S \cdot \delta_S$$

updating said main exposure time $T_{BM}$ based on either one of the following two equations, depending on the determination result in said determination step:

$$T_{BM} = T_{BM} \cdot 10^{J1}$$

$$T_{BM} = T_{BM} \cdot 10^{J2},$$

selecting either a combination of said basic flash exposure time $T_{BF}$ and said shadow density $B_{S0}$ or a combination of said basic bump exposure time $T_{BH}$ and said highlight density $B_{H0}$ depending on the result of said determination step to update the data of the selected combination based on the corresponding one pair of the following two pairs of equations:

$$T_{BF} = T_{BF} \cdot 10^{J2}$$

$$B_{S0} = B_{S0} + J1 - J2$$

or $$T_{BH} = T_{BH} \cdot 10^{J1}$$

$$B_{H0} = B_{H0} + J2 - J1.$$

13. The method according to claim 12, wherein said determination step includes the steps of:
   comparing a density range of said original and a screen range of said screen, and
   determining as to whether said bump exposure is necessary or not according to the result of said density range comparing step.

14. An apparatus for controlling exposure in a process camera at the time of obtaining dot image by exposing image of an original onto a photosensitive material through a screen, said apparatus comprising:
   basic data storing means for storing basic data obtained with respect to a predetermined reference original and the screen and original data,
   means for storing data for correction for determining a correction amount of said original data to obtain dot image having desired contrast,
   measuring means for measuring a dot percentage difference $\delta_H$ between a dot percentage of a highlight region of a first dot image obtained by photographing the original by using the exposure of an amount determined based on said basic data and said original data and a desired dot percentage of a highlight region, and a dot percentage difference $\delta_S$ between a dot percentage of a shadow region of said first image and a desired dot percentage of a shadow region,
   basic data updating means for updating said basic data by acquiring a correction amount of said original data for obtaining second dot image having desired contrast based on said dot percentage differences $\delta_H$ and $\delta_S$ and said data for correction, said basic data being updated based on the obtained correction amount of the original data, and
   exposure amount re-calculating means for recalculating an exposure amount necessary for obtaining said second dot image based on said updated basic data and said original data.

15. The apparatus according to claim 14, wherein said basic data represents tone characteristics of dot image obtained by an exposure using the screen and includes main exposure basic data, bump exposure basic data and flash exposure basic data.

16. The method according to claim 15, wherein
   said main exposure basic data includes:
      basic main exposure time $T_{BM}$, and
      a highlight density $B_{H0}$ and a shadow density $B_{S0}$ of said reference image respectively corresponding to predetermined dot percentages $A_H$ and $A_S$ of a highlight region and a shadow region, respectively, of the dot image obtained by exposing the predetermined reference image for said basic main exposure time $T_{BM}$,
   said bump exposure basic data includes:
      basic bump exposure time $T_{BH}$, and
      a density $B_{H1}$ of a highlight region of said reference image corresponding to a region having said dot percentage $A_H$ in dot image obtained as a result of a bump exposure of said reference image of said basic bump exposure time $T_{BH}$ after the main exposure of said basic main exposure time $T_{BM}$,
   said flash exposure basic data includes:
      basic flash exposure time $T_{BF}$, and
      a density $B_{S1}$ of a shadow region of said reference image corresponding to a region having said dot percentage $A_S$ in dot image obtained as a result of a flash exposure of said reference image of said basic flash exposure time $T_{BF}$ after the main exposure of said basic main exposure time $T_{BM}$, and
   said original data includes:
      a density $D_H$ of a highlight region of said original, said highlight region being to be reproduced to have said dot percentage $A_H$, and
      a density $D_S$ of a shadow region of said original, said shadow region being to be reproduced to have said dot percentage $A_S$.

17. The method according to claim 16, wherein said means for storing data for correction includes:
   means for storing a highlight region correction coefficient $K_H$ for converting said dot percentage difference $\delta_H$ into a correction amount J1 of the density $D_H$ of the highlight region of said original data in order to obtain said desired dot percentage $A_H$ for a highlight region of said obtained dot image, and means for storing a shadow region correction coefficient $K_S$ for converting said dot percentage difference $\delta_S$ into a correction amount J2 of the density $D_S$ of the shadow region of said original data in order to obtain said desired dot percentage $A_S$ for a shadow region of said obtained dot image.

18. The apparatus according to claim 17, wherein said highlight region correction coefficient storing means includes:
first highlight region correction coefficient storing means for storing a first highlight region correction coefficient $K_H$ to be used in an exposure by only the main exposure, and
second highlight region correction coefficient storing means for storing a second highlight region correction coefficient $K_H$ to be used in an exposure by the main exposure and the bump exposure.

19. The apparatus according to claim 18, wherein said highlight region correction coefficient storing means further includes:
means for storing a density $B_{H2}$ of a region of said reference original to be reproduced to have a predetermined dot percentage $A_{H1}$ different from said dot percentage $A_H$, said reproduction being conducted by exposing said reference original by the main exposure of said basic main exposure time $T_{BM}$, and
means for storing a density $B_{H3}$ of a region of said reference original to be reproduced to have said dot percentage $A_{H1}$, said reproduction being conducted by exposing said reference original by the main exposure of said basic main exposure time $T_{BM}$ and the bump exposure of said basic bump exposure time $T_{BH}$,
said first highlight region correction coefficient $K_H$ is obtained by the following equation:

$K_H = (B_{H2} - B_{H0})/(A_{H1} - A_H)$, and said second highlight region correction coefficient $K_H$ is obtained by the following equation:

$K_H = (B_{H3} - B_{H1})/(A_{H1} - A_H)$.

20. The apparatus according to claim 19, wherein said shadow region correction coefficient storing means includes:
means for storing a density $B_{S2}$ of a region of said reference original to be reproduced to have a predetermined dot percentage $A_{S1}$ different from said dot percentage $A_S$, said reproduction being conducted by exposing said reference original by the main exposure of said basic main exposure time $T_{BM}$, and
means for obtaining said shadow region correction coefficient $K_S$ based on the following equation:

$K_S = (B_{S0} - B_{S2})/(A_S - A_{S1})$.

21. The method according to claim 20, wherein said means for updating the basic data includes:
means for selecting either one of said first and second highlight region correction coefficients $K_H$s depending on the determination as to whether the bump exposure, is necessary or not, in order to obtain dot image of said original having desired contrast,
means for obtaining said correction amounts J1 and J2 of the density $D_H$ of said highlight region and the density $D_S$ of said shadow region, respectively, based on the following equations:

$J1 = \pm K_H \cdot \delta_H$ $J2 = \pm K_S \cdot \delta_S$ means for updating said main exposure time $T_{BM}$ according to one of the following two equations, depending on said determination result:

$T_{BM} = T_{BM} \cdot 10^{J1}$ $T_{BM} = T_{BM} \cdot 10^{J2}$ means for selecting either a combination of said basic flash exposure time $T_{BF}$ and said shadow density $B_{S0}$ or a combination of said basic bump exposure time $T_{BH}$ and said highlight density $B_{H0}$ depending on said determination result and updating the two values respectively included in the combinations based on the corresponding one pair of the following two pairs of equations:

$T_{BF} = T_{BF} \cdot 10^{J2}$ $B_{S0} = B_{S0} + J1 - J2$ or $T_{BH} = T_{BH} \cdot 10^{J1}$ $B_{H0} = B_{H0} + J2 - J1$.

22. The apparatus according to claim 20, wherein said dot percentage $A_{H1}$ is selected to be smaller than said dot percentage $A_H$.

23. The apparatus according to claim 22, wherein said dot percentage $A_{S1}$ is selected to be larger than said dot percentage $A_S$.

24. The method according to claim 23, wherein said means for updating the basic data includes:
means for selecting one of said first and second highlight region correction coefficients $K_H$ depending on the result of the determination as to whether the bump exposure is necessary or not in order to obtain dot image of said original having desired contrast,
means for obtaining said correction amounts J1 and J2 of said highlight region density $D_H$ and said shadow region density $D_S$, respectively, of said original data based on the following respective equations:

$J1 = \pm K_H \cdot \delta_H$ $J2 = \pm K_S \cdot \delta_S$ means for updating said main exposure time $T_{BM}$ based on one of the following two equations, depending on said result of determination as to whether the bump exposure is necessary or not:

$T_{BM} = T_{BM} \cdot 10^{J1}$ $t_{BM} = T_{BM} \cdot 10^{J2}$, and
means for selecting either a combination of said basic flash exposure time $T_{BF}$ and said shadow density $B_{S0}$ or a combination of said basic bump exposure time $T_{BH}$ and said highlight density $B_{H0}$ depending on said result of the determination as to whether the bump exposure is necessary or not and updating two values respectively included in the combinations based on the corresponding one pair of the following two pairs of two equations:

$$T_{BF} = T_{BF} \cdot 10^{J2}$$

$$B_{S0} = B_{S0} + J1 - J2$$

or $$T_{BH} = T_{BH} \cdot 10^{J1}$$

$$B_{H0} = B_{H0} + J2 - J1.$$

* * * * *